United States Patent Office 2,716,670
Patented Aug. 30, 1955

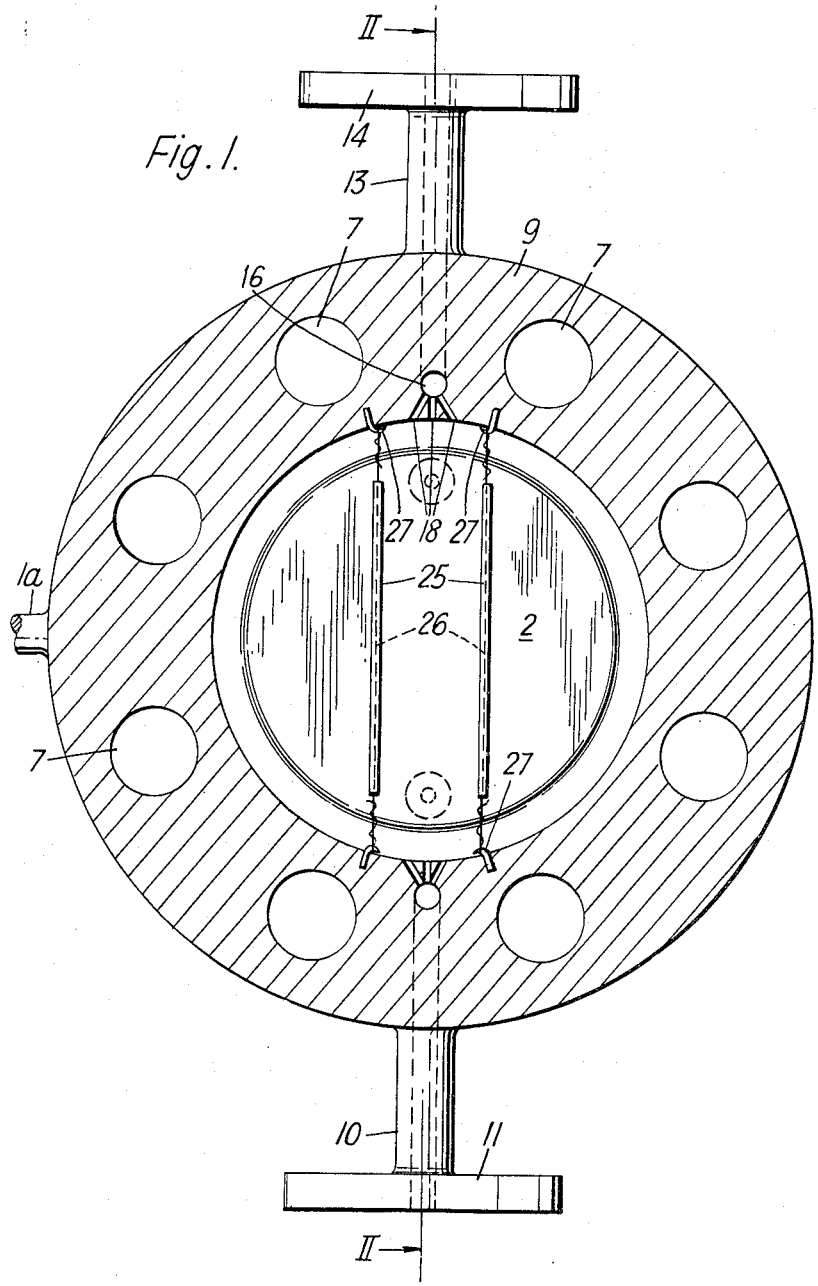

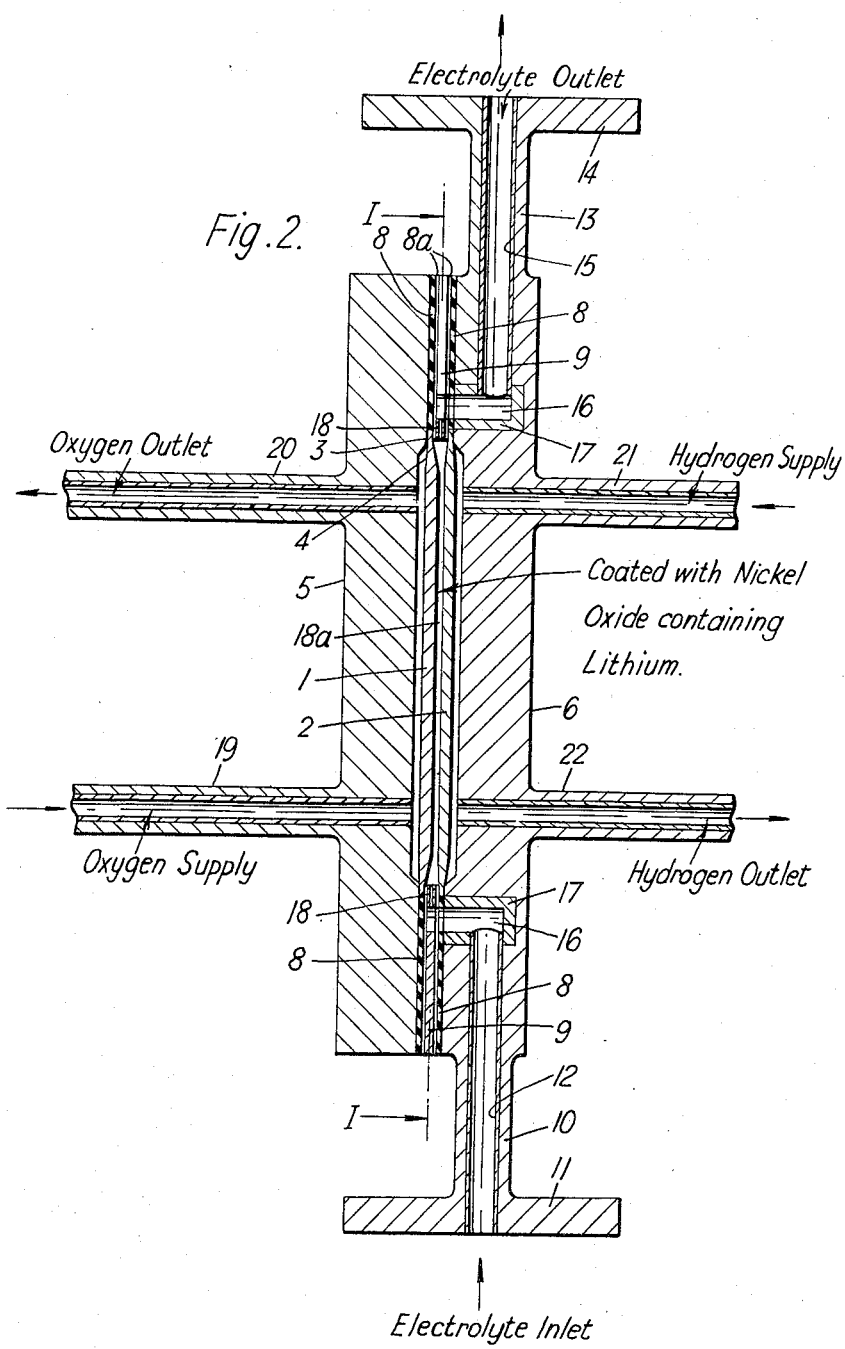

2,716,670

ALKALINE PRIMARY CELLS

Francis Thomas Bacon, Little Shelford, England, assignor to E. R. A. Patents Limited, Leatherhead, Surrey, England Application January 11, 1954, Serial No. 403,393

Claims priority, application Great Britain January 16, 1953

8 Claims. (Cl. 136—86)

The properties of nickel in regard to resistance to corrosion have, of course, been largely recognized, and accordingly it is used for making many articles which have to resist corrosion, such as vessels for use in chemical processes and so forth.

If nickel is heated in air, it acquires a surface layer of oxide and the state and thickness of the surface layer depend upon the temperature employed. It is found that if a piece of porous nickel is heated at temperatures from 800 to 1000° C. in air, a coating of green or greyish green nickel oxide is formed and nickel so treated is found to be resistant to corrosion to a high degree. In fact, it shows good properties of resistance to corrosion when in contact with alkaline liquids at relatively high temperatures and high pressures even under strongly oxidising conditions such as occur when oxygen also is present at high pressure.

In many applications, such resistance to corrosion is not necessarily required but, on the other hand, under other conditions, the resistance to corrosion of this degree is valuable. For example, in alkaline primary electric cells in which porous nickel electrodes are employed, deterioration of these electrodes can occur due to rapid corrosion under the above conditions at temperatures at or above about 100° C., and such corrosion can be largely prevented by the formation at high temperature of a coating of a green nickel oxide on the surface.

In alkaline primary batteries with which the present invention is mainly concerned, however, the coating of the electrodes with a layer of green nickel oxide is not practicable because that layer exhibits a high electrical resistance.

It has been known only quite recently that if lithium atoms are introduced into the crystal lattice of nickel oxide, the electrical conductivity of that oxide can be increased by a factor as great as $10^6$ and the surface layer then becomes black instead of green or greyish green.

Thus, according to the present invention, a porous nickel electrode in an alkaline primary cell is coated with the black nickel oxide into the crystal lattice of which lithium has been introduced, with the result that the desired resistance to corrosion under the onerous conditions arising in such a cell is obtained while the internal resistance of the cell is not greatly increased by the presence of the protective layer of the oxide. In the specification of British Patent No. 667,298, a primary electrical cell is disclosed with a pair of porous electrodes with an electrolyte in the space between them, and with spaces for hydrogen and oxygen on the outsides of the respective electrodes, each of the plates being constructed so as to have a layer on the gas side containing larger pores than that on the electrolyte side, and the present invention may well be applied to such a cell by providing a layer of the lithium-nickel oxide over the whole surface of the oxygen electrode in particular since it is found that the hydrogen electrode stands up to corrosion remarkably well.

It is desirable to prevent corrosion at some parts of the internal walls of the cell, for example, at the electrolyte ports and the gas ports and to avoid electrochemical activity there. For that purpose, those parts may be coated with the non-conducting green nickel oxide referred to above.

In order that the invention may be clearly understood and readily carried into effect, an example of a cell according to the present invention and the manner of placing the cell in operation and maintaining it in operation, will now be more fully described with reference to the accompanying drawings, in which:

Figure 1 is a vertical central section through the cell on a plane parallel to the faces of the electrodes; and Figure 2 is a vertical section of the cell on the line II—II in Figure 1.

The construction illustrated in the drawings is the same as that shown and described in my British Patent 667,298, except that the oxygen electrode is provided with a layer of lithium-nickel oxide preferably over its whole surface but at least over the surface which forms the liquid side of the electrode.

Referring particularly to Figures 1 and 2, the cell has two plates in the form of circular discs comprising the oxygen electrode 1 and the hydrogen eelctrode 2. Each of the electrodes has the central part porous and a flat rim 3 which is substantially non-porous. The central porous part has a thickness of 3 mms. and the rim a thickness of about 1.1 to 1.5 mms. The overall diameter of each plate 1, 2 is about 13.3 cms. with the central porous part of a diameter of about 10.8 cms. so that the radial depth of the rim is about 1.25 cms.

The body or container of the cell consists of two strong steel discs 5, 6 nickel-plated on their inner surfaces to provide resistance to the corrosive action of the alkali solution and of the gases. The steel discs are formed so that when secured together by insulated bolts passed through the holes 7, a cavity to contain the electrodes 1, 2 remains centrally between the two discs 5, 6. Between the outer parts of the steel discs 5, 6 a distance piece 9 of nickel or nickel-plated steel is inserted and the rims 3 of the two electrode plates 1, 2 are clamped between the discs 5, 6 and the distance piece 9 with rings 8a of thin insulating jointing material interposed between the rims 3 and the distance piece 9. Also, two further rings 8 of insulating jointing material fitting around the periphery of the electrode plates 1, 2 are interposed between the plates 5, 6 and the rings 8a. Each electrode is thus in metallic contact around its rim with a wall of the cell so that each half of the cell which is electrically insulated from the rest of the apparatus, takes up the potential of its own electrode. Steel terminal rods 1a are welded to the periphery of each half of the cell and take off the load current. One of the steel discs 6 is formed with a downward tubular extension 10 flanged at 11 and with a bore furnished with a nickel lining 12 to serve as the inlet port for the electrolyte. Similarly, the disc 6 has an upward extension 13 flanged at 14 with a bore lined with nickel 15 to provide the outlet port for the eletcrolyte. The inlet and outlet ports open into transverse ports 16 in the disc 6 which are furnished with a nickel lining 17. These transverse ports 16 communicate with radial passages 18 leading into the central space 18a between the electrodes 1, 2. The insulating jointing material 8 may conveniently consist of jointing free from sulphur with an asbestos base suitable for high pressures.

The central space 18a is filled with the electrolyte which may consist of a 26.8 per cent or weaker solution of caustic potash. However, caustic soda which is cheaper may be used, and stronger solutions may also be used.

In each of the steel discs 5, 6 there are two horizontal pipes made of or lined with pure nickel as are all the pipes which can come into contact with the caustic electrolyte; the pipes 19, 20 connected to the steel disc 5 serve respectively for the inlet of oxygen to the sealed space outside the electrode 1 and for the escape of oxygen from that space. The pipes 21, 22, connected to the disc 6 are respectively the hydrogen inlet and the outlet pipes.

In order to explain the invention more fully, some examples will now be set out in greater detail of the method of making the porous nickel electrodes according to the present invention.

*Example 1*

The main part of the electrode with the larger pores that is to say the part forming the side in contact with the gas, is made by dusting relatively coarse nickel powder of a particle size of about 50 microns, into a mould and sintering without compacting under pressure, at a temperature of 1350° C. for one hour in an atmosphere of hydrogen or of hydrogen and nitrogen.

The layer with the finer pores to form the liquid side of the electrode is applied by spraying on to the part already formed a suspension in alcohol of finer nickel powder having a particle size of about 7 microns. This layer is attached to the underlying part by sintering for one hour at a temperature of 1000° C. To seal any leaks in this fine pore layer, nickel powder of the 7 micron particle size may be rubbed on and the electrode resintered for one hour at 1000° C.

The resulting electrode is now soaked in a solution of lithium hydroxide. The solution employed is a saturated solution at room temperature that is to say, a solution containing approximately 12.7 gms. of lithium hydroxide per 100 millilitres of water. The electrode is then dried at 120° C. and oxidised by heating in air at 800° C. for five minutes.

*Example 2*

In this case, the main part of the electrode is produced from nickel powder of 7 micron particle size by mixing it with a spacing agent consisting of 20 per cent by weight of ammonium bicarbonate which is graded by sifting to a particle size which may vary from electrode to electrode. Thus the particles may be, for example, within the range of 60 to 90 per linear inch or 150 to 200 per linear inch. The mixture of nickel powder and ammonium bicarbonate is compressed at 15 tons per square inch and sintered for one hour at 1150° C.

The fine pore layer may be applied by spraying on to the electrode a suspension in alcohol of the so-called A-nickel powder which, as is known, consists essentially of particles which vary in size from 2 to 15 microns and which forms compacts in which the particles are mechanically but very loosely held together. The bulk density of this variety of nickel powder varies from 0.6 to 4.5 gms. per cc. After spraying on the powder, the electrode is sintered for one hour at 1000° C. Leaks may be sealed in a manner similar to that already mentioned by rubbing on A-nickel powder and resintering for one hour at 1000° C. The resulting electrode is then soaked in a solution formed by mixing one volume of saturated lithium hydroxide solution with four volumes of distilled water. The electrode is now dried at 140° C. and oxidised in air for 5 minutes at 1000° C.

*Example 3*

The main part of the electrode is made from the so-called B-nickel powder mixed with 30 per cent by weight of the graded ammonium bicarbonate already referred to. This mixture is compressed at 7.5 tons per square inch and sintered for one hour at 1000° C. This B-nickel powder as is known consists essentially of smaller particles than A-nickel but its particles are interlocked in a fibre-like fashion which are stronger than the loose compacts in the A-nickel and also are themselves interlocked. It thus follows that the bulk density of the B-nickel powder is lower and, in fact, it varies from about 0.3 to 1.2 gms. per cc. This powder contracts more than the A-nickel during sintering.

A suitable fine pore layer may be formed by painting on a suspension of A-nickel powder in alcohol. The electrode is then sintered for five minutes at 950° C. Any leaks may be sealed as in the above examples by rubbing on A-nickel powder and resintering for 5 minutes at 950° C.

The electrode is next soaked in a solution of 10 gms. of lithium hydroxide per 100 millilitres of distilled water and dried at 120° C. It is then oxidised by heating in air for seven minutes at 700° C.

*Example 4*

In this case, B-nickel powder mixed with 30 per cent by weight of the graded ammonium bicarbonate to serve as a spacing agent is again used to produce the main part of the electrode. The mixture is compressed at 2.5 tons per square inch and sintered for five minutes at a temperature of 800° C.

The B-nickel powder is also used for the fine pore layer and is painted on to the main part in the form of a suspension in alcohol and is attached to the underlying body by sintering for five minutes at 800° C. Any leaks may be repaired by rubbing in the B-nickel powder and resintering for five minutes at 800° C. The electrode is then soaked in saturated solution of lithium hydroxide, dried at 150° C. and oxidised in air for five minutes at 750° C.

Of course, a number of variants of the details given in the above examples are possible. Thus a weaker solution of the lithium compound may be used and in some cases, is more suitable in the treatment of electrodes having large surfaces. Other compounds of lithium such as lithium carbonate may be used. Also, in some cases, a lower oxidising temperature than those cited in the above examples may be adopted. Thus very active nickel pacts such as those made from very fine powder and sintered at a low temperature will react with lithium hydroxide at temperatures as low as 500° C. Other media than alcohol may be employed in suspending the nickel powder to be sprayed or painted on to the electrode such as volatilisable liquids including water, acetone, benzene, trichlorethylene, or ether or a solution such as a solution of poly-methacrylate in trichlorethylene diluted down with benzene.

The sintering may be carried out in various reducing atmospheres of which examples are hydrogen, forming gas consisting of 90 per cent of nitrogen and 10 per cent of hydrogen or in cracked ammonia, that is nitrogen and hydrogen. Finally instead of oxidising in air, other oxidising atmospheres may be used such as air containing steam or nitrogen containing a relatively small percentage of oxygen.

During the oxidation, the nickel oxidises very rapidly resulting in a surface of black oxide containing the lithium atoms. As already explained, the introduction of these lithium atoms increases the conductivity of the nickel oxide layer by a considerable amount and, in fact, to such an extent that the layer does not materially increase the internal resistance of a cell into which the electrodes are built.

What I claim is:

1. An electrical primary cell comprising a container, an electrode of nickel mounted in said container and having a coating of nickel oxide in which lithium is incorporated and an alkaline electrolyte in contact with said electrode.

2. An electrical primary cell, comprising a container, a pair of nickel electrodes mounted in said container enclosing a space between them, an alkaline electrolyte in said space in contact with the inner surfaces of both of said electrodes, a volume of hydrogen gas in contact with the outer surface of one of said electrodes and a volume of oxygen gas in contact with the outer surface of said other electrode, said last-named electrode having the whole of its surface which is in contact with said electrolyte, coated with nickel oxide in which lithium is incorporated.

3. A method of forming a nickel electrode for an alkaline primary cell which comprises, soaking a nickel electrode with a solution of a lithium compound and oxidising a surface layer of said electrode by heating in an oxidising atmosphere.

4. A method of forming a nickel electrode for an alkaline primary cell which comprises, sintering a mass of fine nickel powder to form a porous body, soaking said body with a solution of a lithium compound and oxidising a surface layer of said electrode by heating in an oxidising atmosphere.

5. A method of forming a nickel electrode for an alkaline primary cell which comprises, sintering a mass of fine nickel powder at a temperature of 800° C. to 1350° C. to form a porous body, soaking said body with a solution of a lithium compound and oxidising a surface layer of said electrode by heating in an oxidising atmosphere.

6. A method of forming a nickel electrode for an alkaline primary cell which comprises, soaking a nickel electrode with a solution of a lithium compound and oxidising a surface layer of said electrode by heating in an oxidising atmosphere at a temperature of from 500° C. to 1000° C.

7. A method of forming a nickel electrode for an alkaline primary cell which comprises, sintering a mass of fine nickel powder to form a porous body, soaking said body with a solution of a lithium compound and oxidising a surface layer of said electrode by heating in an oxidising atmosphere at a temperature of from 500° C. to 1000° C.

8. A method of forming a nickel electrode for an alkaline primary cell which comprises, sintering a mass of fine nickel powder at a temperature of 800° C. to 1350° C. to form a porous body, soaking said body with a solution of lithium compound and oxidising a surface layer of said electrode by heating in an oxidising atmosphere at a temperature of from 500° C. to 1000° C.

References Cited in the file of this patent

UNITED STATES PATENTS 2,672,494  Fleischer _____ Mar. 16, 1954